United States Patent
Hayakawa et al.

(10) Patent No.: US 7,549,688 B2
(45) Date of Patent: Jun. 23, 2009

(54) ROBOT HAND

(75) Inventors: Masato Hayakawa, Wako (JP);
Takafumi Fukushima, Wako (JP);
Kazuhiro Kishimoto, Wako (JP);
Kazuyuki Takahashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 409 days.

(21) Appl. No.: 10/570,329

(22) PCT Filed: Aug. 31, 2004

(86) PCT No.: PCT/JP2004/012573

§ 371 (c)(1),
(2), (4) Date: Mar. 2, 2006

(87) PCT Pub. No.: WO2005/032771

PCT Pub. Date: Apr. 14, 2005

(65) Prior Publication Data

US 2007/0018470 A1    Jan. 25, 2007

(30) Foreign Application Priority Data

Sep. 12, 2003    (JP) .............................. 2003-321850

(51) Int. Cl.
*B25J 13/08*    (2006.01)
(52) U.S. Cl. ...................... 294/106; 294/902; 294/907; 901/33; 901/34

(58) Field of Classification Search ................. 294/106, 294/902, 907; 901/33, 34, 39, 46; 623/57, 623/63, 64
See application file for complete search history.

(56) References Cited

U.S. PATENT DOCUMENTS 3,904,234 A * 9/1975 Hill et al. .................... 294/106

(Continued)

FOREIGN PATENT DOCUMENTS

EP    0 133 997    3/1985

(Continued)

OTHER PUBLICATIONS

European search report 04772529.6-2316 dated Dec. 14, 2007.

(Continued)

*Primary Examiner*—Dean J Kramer
(74) *Attorney, Agent, or Firm*—Squire, Sanders & Dempsey, L.L.P.

(57) ABSTRACT

In a robot hand, at least one finger link thereof is configured to comprise a first member, a second member adhered to a surface of the first member and a third member covering at least the second member and a rigidity of the second member is made smaller than the rigidities of the first member and the third member. With this, the flexibility of the finger is improved by the second member, thereby increasing the contact area between the third member and a held object, so that the object can be securely held.

1 Claim, 10 Drawing Sheets

U.S. PATENT DOCUMENTS

| | | | |
|---|---|---|---|
| 4,492,949 A * | 1/1985 | Peterson et al. | 338/114 |
| 4,539,554 A * | 9/1985 | Jarvis et al. | 310/311 |
| 4,555,953 A * | 12/1985 | Dario et al. | 73/862.046 |
| 4,746,894 A * | 5/1988 | Zeldman | 338/99 |
| 4,964,302 A * | 10/1990 | Grahn et al. | 73/865.7 |
| 5,062,673 A | 11/1991 | Mimura | |
| 5,200,679 A * | 4/1993 | Graham | 318/568.16 |
| 5,373,747 A | 12/1994 | Ogawa et al. | |
| 7,168,748 B2 * | 1/2007 | Townsend et al. | 294/106 |

FOREIGN PATENT DOCUMENTS

| | | |
|---|---|---|
| JP | 61-056539 | 4/1986 |
| JP | 2-256489 A | 10/1990 |
| JP | 04-029388 | 3/1992 |
| JP | 06-182688 | 5/1994 |
| JP | 7-8477 B | 2/1995 |

OTHER PUBLICATIONS

Written Opinion of the International Searching Authority for International Application No. PCT/JP2004/012573, Box No. V.

Japanese Office Action, Dated Dec. 9, 2008, Issued on Japanese Application No. 2003-321850.

* cited by examiner

16a3
16a36

16a3
16a37

ROBOT HAND

TECHNICAL FIELD

This invention relates to a robot hand, particularly to the structure of the fingers of a robot hand.

BACKGROUND ART

The fingers (more specifically, finger tips) of a robot hand are generally formed of a single material having an appropriate coefficient of friction (e.g., silicone rubber). In contrast, the below-mentioned Non-patent Ref. No. 1 teaches formation of a finger tip from a skeletal frame and a nail made of aluminum, and skin made of soft sponge that covers the skeletal frame. Further, as set out in Patent Ref. No. 1, rigid inner skin is provided to cover a tactile sensor attached to a base portion serving as a skeletal frame and flexible outer skin is provided to cover the inner skin.

Non-patent Ref. No. 1: Paper at the 16th Annual Conference of the Robotics Society of Japan, "Development of finger-tip of its structural design aimed at adjustment of contact area," Robotic Society of Japan, September 1998, pp 1437-1438.

Patent Ref. No. 1: Japanese Patent Publication Hei 7(1995)-8477

DISCLOSURE OF INVENTION

Problems to be Solved by the Invention

The fingers of a robot hand should preferably be high in coefficient of friction to enable secure holding of objects. In addition, a large contact area is preferably established between the fingers and the object. Enlargement of the contact area between a finger and the held object requires the finger (more specifically, area of the finger making contact with the object) to be given high flexibility so that it can deform in compliance with the shape or profile of the object.

However, when, as in the case of most conventional robot hands, the fingers are, in consideration of coefficient of friction, formed of a single rubber-based material of relatively high rigidity or stiffness such as silicone rubber, it is impossible to impart high enough flexibility to enable deformation in compliance with the shape of the object.

Moreover, in the prior art of Non-patent Ref. No. 1 and Patent Ref. No. 1, good flexibility cannot be achieved at the contact surface with a held object because a hard member (link) corresponding to a human bone is merely covered with a thin flexible member (comprising only one or two layers) corresponding to human skin.

A first object of this invention is therefore to overcome the aforesaid inconveniences by providing a robot hand that is improved in finger flexibility to enable objects to be grasped securely.

Another problem experienced is that when a force sensor is attached to a finger for detecting stress acting on the finger, the accuracy of stress detection decreases when the flexibility of the finger is increased.

A second object of this invention is therefore to provide a robot hand configured to improve finger flexibility, thereby enabling secure holding of objects, and improve the detection accuracy of a force sensor attached to the finger.

Means for Solving the Problems

BRIEF SUMMARY OF THE INVENTION

In accordance with an exemplary embodiment of the present invention there is provided a robot hand having a finger including finger links and finger joints interconnecting the links. At least one of the finger links includes a first member, a second member adhered to a surface of the first member, and a third member covering at least the second member. A rigidity of the second member is made smaller than the rigidities of the first member and the third member.

In accordance with certain exemplary embodiments, a coefficient of friction of the third member is made higher than the coefficients of friction of the first member and the second member.

In accordance with certain exemplary embodiments, a thickness of the third member is made smaller than the thickness of the second member.

In accordance with certain exemplary embodiments, the first member is made of a resin material.

In accordance with certain exemplary embodiments. the second member is made of a flexible material.

In accordance with certain exemplary embodiments, the third member is made of a material with a high coefficient of friction.

In accordance with certain exemplary embodiments, a surface of the third member is formed with a plurality of indentations.

In accordance with another exemplary embodiment of the present invention, the robot hand further includes: a fourth member adhered to a part of a surface of the third member; wherein the rigidity of the fourth member is made larger than the rigidity of the second member.

In accordance with certain exemplary embodiments, the fourth member is made of a resin material.

In accordance with another exemplary embodiment of the present invention there is provided a robot hand having a finger comprising finger links and finger joints interconnecting the links. At least one of the finger links includes a base to which a force sensor is attached, and a first member connected to the base through the force sensor. The finger link further includes a second member adhered to a surface of the first member, a third member covering at least the second member, and a fourth member adhered to a part of a surface of the third. The fourth member is interconnected with the force sensor.

In accordance with certain exemplary embodiments, the fourth member is interconnected with the force sensor through a connector.

BEST MODE FOR CARRYING OUT THE INVENTION

Preferred embodiments for implementing the robot hand according to this invention are explained with reference to the attached drawing in the following.

First Embodiment

Figure 1:
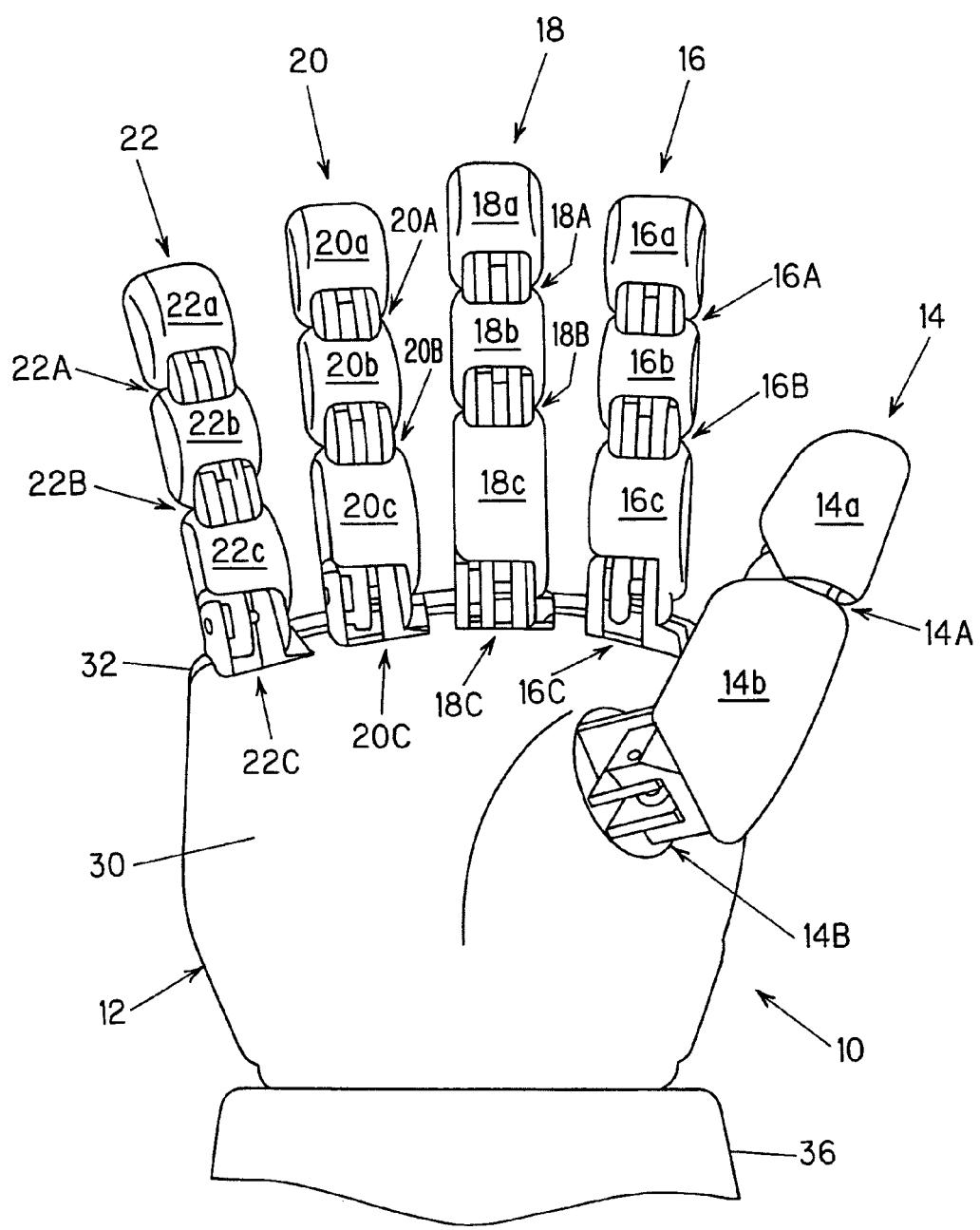
FIG. 1 is a plan view of a robot hand seen from the palm side thereof according to a first embodiment of this invention.

FIG. 1 is a plan view seen from the palm side of a robot hand that is a first embodiment of this invention.

In FIG. 1, symbol 10 designates a robot hand. The robot hand 10 comprises a metacarpus (palm section) 12 and first to fifth fingers 14 to 22 connected to the palm 12. The first to fifth fingers 14 to 22 correspond to the thumb, index finger, middle finger, ring finger and little finger of a human hand.

The metacarpus 12 comprises a palm forming member 30 that forms the surface of the palm of the hand and back forming member 32 that forms the surface of the back of the hand. First to fifth electric motors (stepping motors; not shown) for driving the five finger 14 to 22 are disposed inside the metacarpus 12. The proximal end of the metacarpus 12 is connected to an arm 36 of a robot (not shown). The robot equipped with the arm 36 is a biped humanoid robot.

Each of the first to fifth fingers comprises a plurality of finger links and finger joints interconnecting the links. Specifically, the first finger (thumb) 14 comprises a distal link 14a, a proximal link 14b, first joint 14A connecting the two links, and a second joint 14B connecting the proximal link 14b and the metacarpus 12. The second finger (index finger) 16 comprises a distal link 16a, a middle link 16b, a proximal link 16c, a first joint 16A connecting the distal link 16a and middle link 16b, a second joint 16B connecting the middle link 16b and proximal link 16c, and a third joint 16C connecting the proximal link 16c and the metacarpus 12. The third finger 18, fourth finger 20 and fifth finger 22 are structured similarly to the second finger 16.

Figure 2:
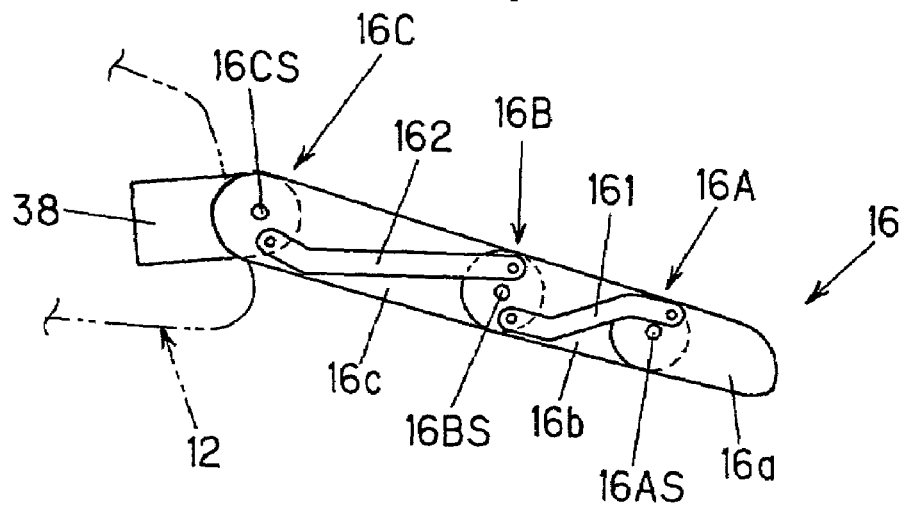
FIG. 2 is an explanatory diagram schematically illustrating the structure of a second finger shown in FIG. 1.
Figure 3:
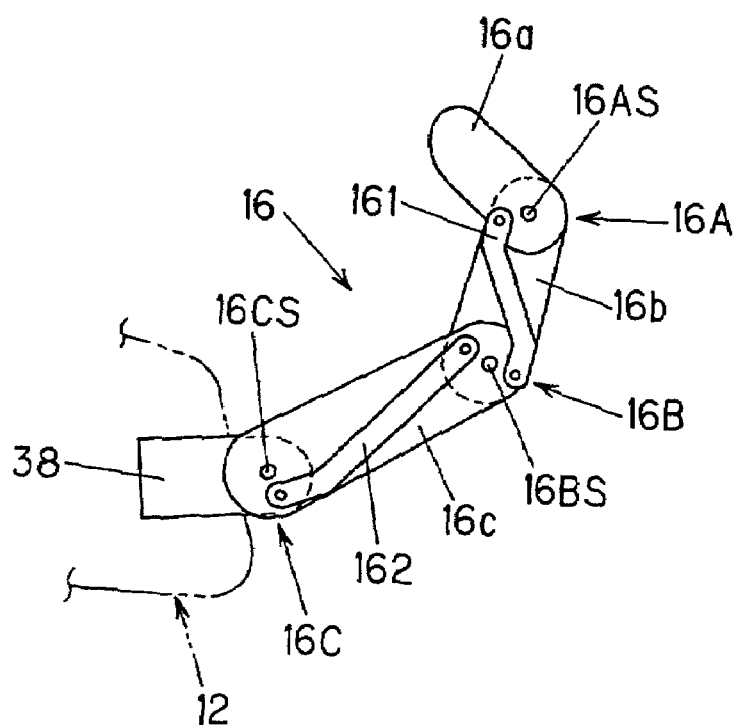
FIG. 3 is a similar explanatory diagram schematically illustrating the structure of the second finger shown in FIG. 1.

FIGS. 2 and 3 are explanatory diagrams schematically illustrating the structure of the second finger 16.

As illustrated, the proximal link 16c is connected through the third joint 16C to a fixed member 38 fastened to the metacarpus 12. The second finger 16 is further equipped with a first arm 161 extending parallel to the middle link 16b and a second arm 162 extending parallel to the proximal link 16c.

One end of the first arm 161 is connected to the proximal link 16c at a point near a second joint pivot shaft 16BS and the other end thereof is connected to the distal link 16a at a point near a first joint pivot shaft 16AS. One end of the second arm 162 is connected to the fixed member 38 fastened to the metacarpus 12 and the other end thereof is connected to the middle link 16b at a point near the second joint pivot shaft 16BS.

The third joint 16C is connected to the output shaft of an electric motor not shown in the drawings. When the third joint 16C (proximal link 16c) is rotated by the rotational output of the electric motor, the second joint 16B (middle link 16b) is rotated via the second arm 162, and the first joint 16A (distal link 16a) is rotated through the first arm 161. As a result, the second finger 16 is bent as shown in FIG. 3.

Like the second finger 16, the third finger 18, fourth finger 20 and fifth finger 22 are also provided with first arms and second arms (not shown) and are driven by electric motors (not shown) connected to their third joints to perform bending movement. The first finger 14 is equipped with only a first arm (not shown) extending parallel to the proximal link 14b and is driven by an electric motor (not shown) connected to the second joint to perform bending movement.

As set out in the foregoing, in the robot hand 10 according to this embodiment, the fingers can be bent to grasp an object by operating the electric motors connected to the third joints (or second joint) of the fingers.

The fingertip structure of the fingers that is the characterizing feature of this invention will now be explained with reference to FIGS. 4 to 17.

Figure 4:
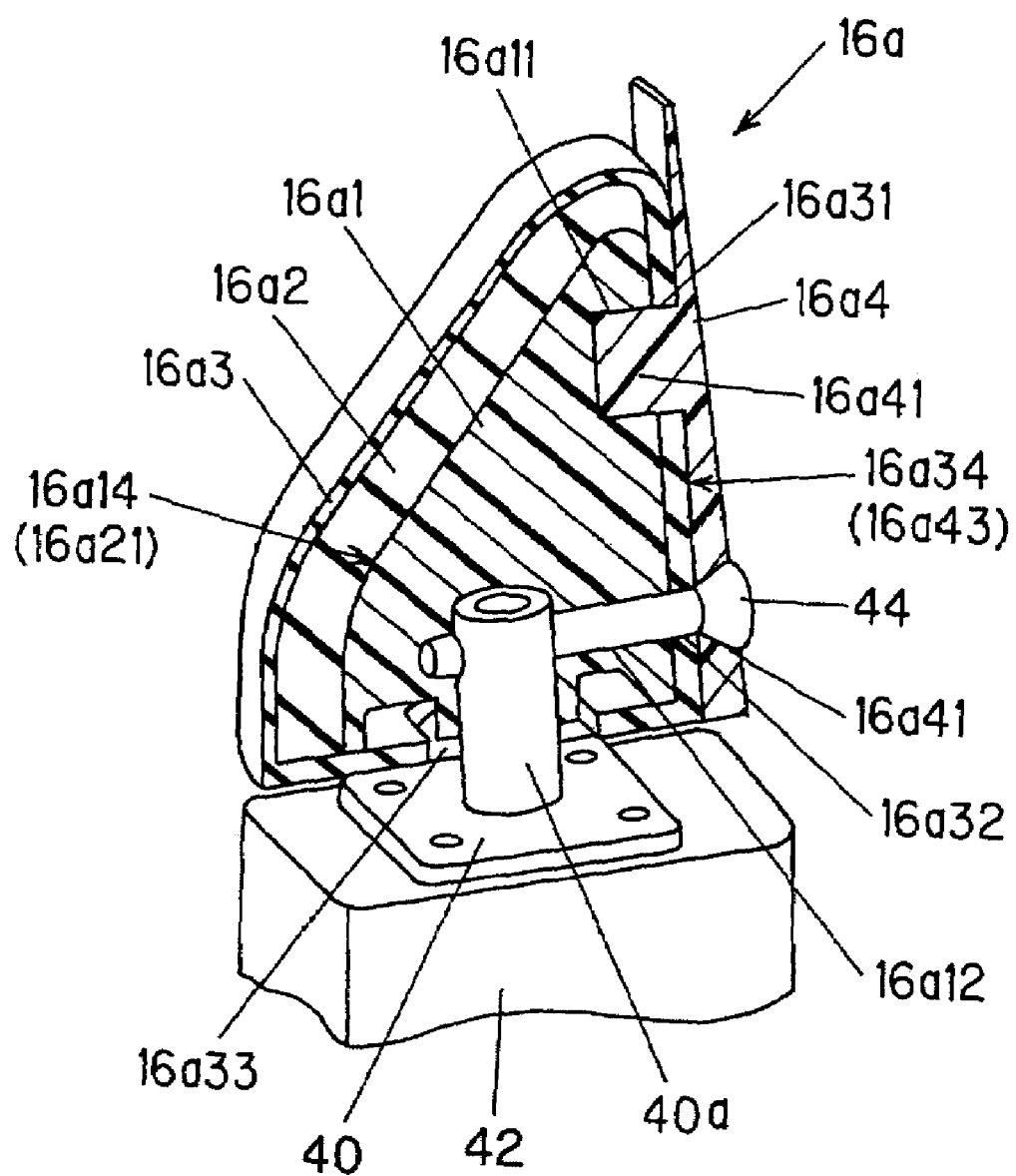
FIG. 4 is a perspective view, partially in section, of a distal link of the second finger shown in FIG. 1.

FIG. 4 is a perspective view, partially in section, of the distal link 16a of the second finger 16.

The fingertip structure of the robot hand according to this embodiment will be explained taking the distal link 16a as an example. As illustrated, the distal link 16a is provided with a first member 16a1 situated in the middle of the distal link 16a, a second member 16a2 adhered to part of the surface of the first member 16a1, a third member 16a3 covering the first member 16a1 and second member 16a2, and a fourth member 16a4 adhered to part of the surface of the third member. The first member 16a1 to fourth member 16a4 correspond to the bone, flesh, skin and nail of a human fingertip.

The first member 16a1 is connected to a base 42 through a force sensor (three-axis force sensor) 40 and a high-rigidity cylindrical member 40a made of metal or a resin material that is fastened to the force sensor 40. The base 42 is connected to the middle link 16b through the first joint 16A.

Figure 5:
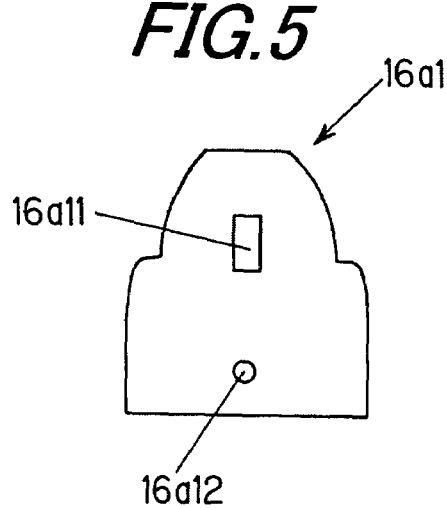
FIG. 5 is a plan view of a first member shown in FIG. 4.
Figure 6:
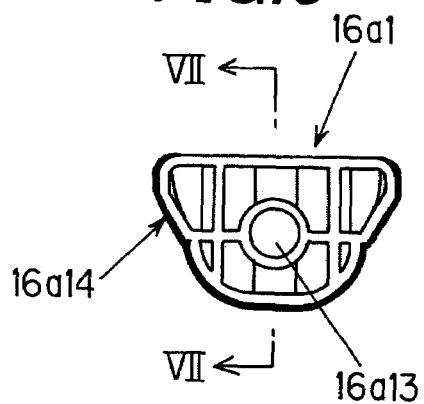
FIG. 6 is a bottom view of the first member shown in FIG. 4.
Figure 7:
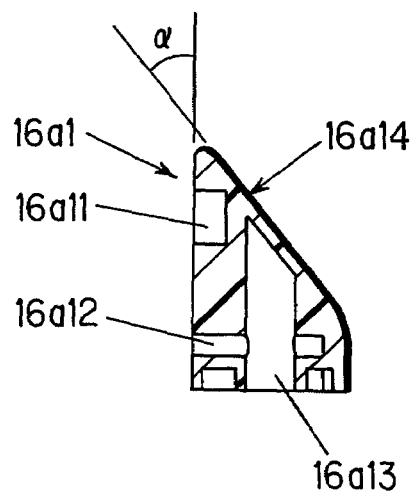
FIG. 7 is a sectional view taken along line VII-VII in FIG. 6.

FIG. 5 is a plan view of the first member 16a1 (seen from the side of the fourth member 16a4). FIG. 6 is a bottom view of the first member 16a1 (seen from below in the drawing sheet of FIG. 5). FIG. 7 is a sectional view taken along line VII-VII in FIG. 6.

As shown in FIGS. 5 to 7, the first member 16a1 is provided with a first hole 16a11, a second hole 16a12, and a third hole 16a13 lying orthogonal to the second hole 16a12. In the first member 16a1, the surface designated by the symbol 16a14 (indicated by bold lines in FIGS. 6 and 7) is a surface contacted by the second member 16a2 (hereinafter called the "second member contact surface"). The second member contact surface 16a14 is given an inclination of a prescribed angle α (e.g., about 40 degrees) relative to the longitudinal direction of the distal link 16*a*. The first member 16*a*1 is made of a resin material (in this embodiment, epoxy resin material).

Figure 8:
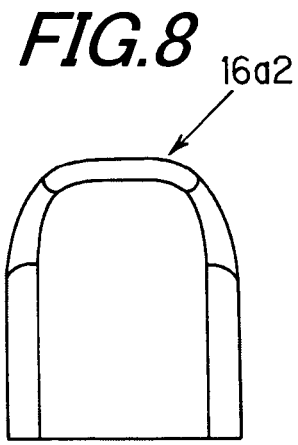
FIG. 8 is a plan view of a second member shown in FIG. 4.
Figure 9:
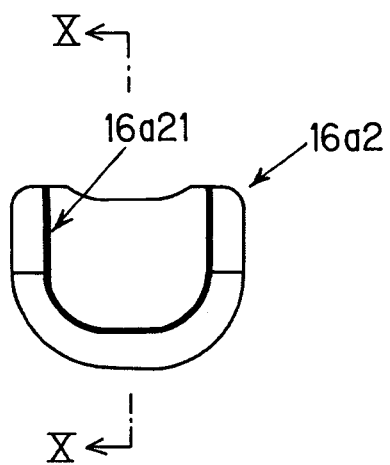
FIG. 9 is a bottom view of the second member shown in FIG. 4.
Figure 10:
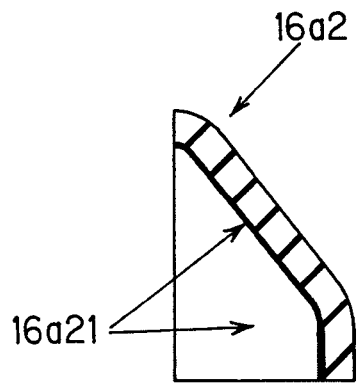
FIG. 10 is a sectional view taken along line X-X in FIG. 9.

FIG. 8 is a plan view of the second member 16*a*2. FIG. 9 is a bottom view of the second member 16*a*2 (seen from below in the drawing sheet of FIG. 8). FIG. 10 is a sectional view taken along line X-X in FIG. 9. In FIGS. 9 and 10, the surface designated by symbol 16*a*21 (indicated by bold lines) is a surface contacted by the second member contact surface 16*a*14 (hereinafter called the "first member contact surface"). The first member contact surface 16*a*21 is shaped to run along the second member contact surface 16*a*14. The second member 16*a*2 is made of a flexible material having flexibility of an HS hardness of around 2 to 15 (in this embodiment, gel elastomer) and is fastened to the first member 16*a*1 through an elastic adhesive or the like.

Figure 11:
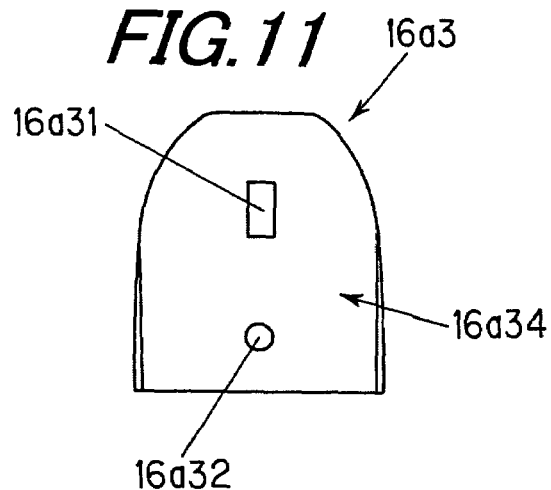
FIG. 11 is a plan view of a third member shown in FIG. 4.
Figure 12:
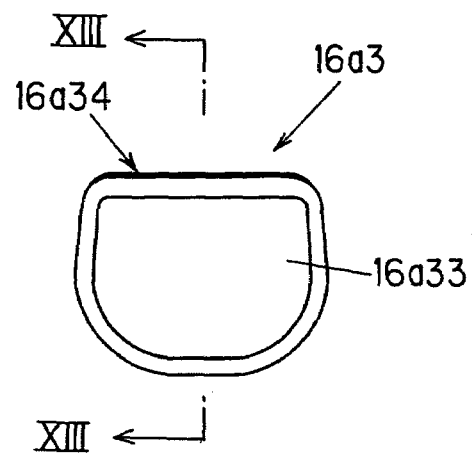
FIG. 12 is a bottom view of the third member shown in FIG. 4.
Figure 13:
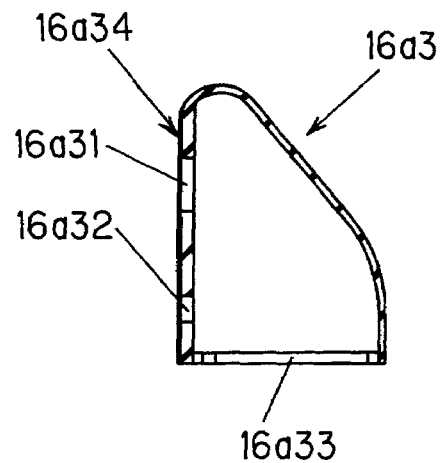
FIG. 13 is a sectional view taken along line XIII-XIII in FIG. 12.
Figure 14:
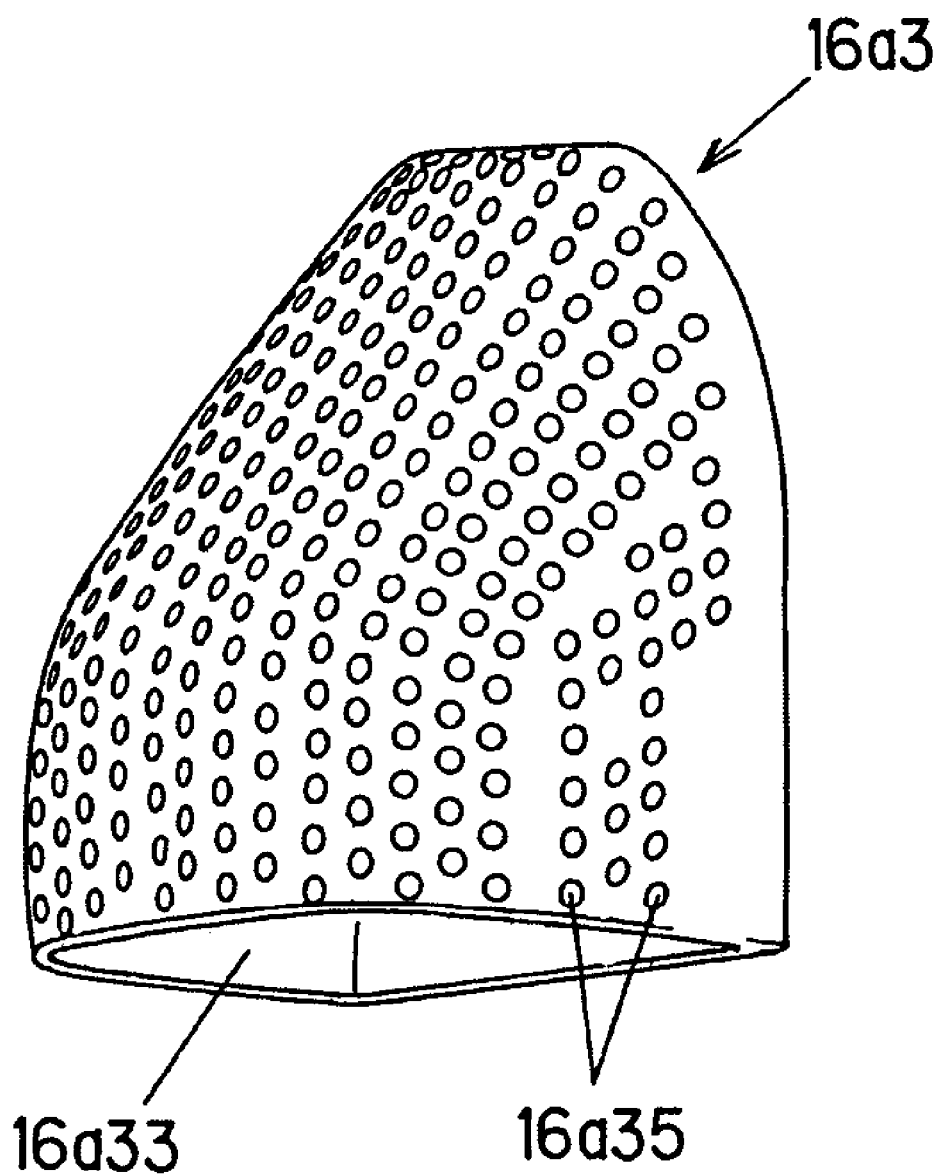
FIG. 14 is a perspective view showing the surface morphology of the third member shown in FIG. 4.

FIG. 11 is a plan view of the third member 16*a*3. FIG. 12 is a bottom view of the third member 16*a*3 (seen from below in the drawing sheet of FIG. 11). FIG. 13 is a sectional view taken along line XIII-XIII in FIG. 12. FIG. 14 is a perspective view showing the surface morphology of the third member 16*a*3. As shown in FIGS. 11 to 13, the third member 16*a*3 is pouch-like.

The third member 16*a*3 is formed with a first hole 16*a*31, second hole 16*a*32 and a third hole 16*a*33. In the third member 16*a*3, the surface designated by the symbol 16*a*34 (indicated by bold lines in FIGS. 12 and 13) is a surface contacted by the fourth member 16*a*4 (hereinafter called the "fourth member contact surface"). The third member 16*a*3 is made of a material with a high coefficient of friction (in this embodiment, urethane material), and its surface is formed with a plurality of indentations 16*a*35 that give it a bumpy (dimpled) shape, as shown in FIG. 14, and is imparted with a high coefficient of friction (more exactly, coefficient of static friction) of around 1 to 10.

Figure 15:
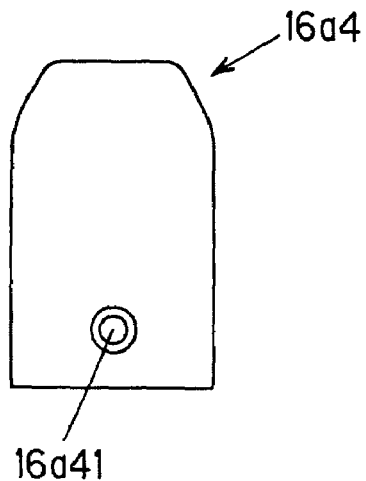
FIG. 15 is a plan view of a fourth member 16a4 shown in FIG. 4.
Figure 16:
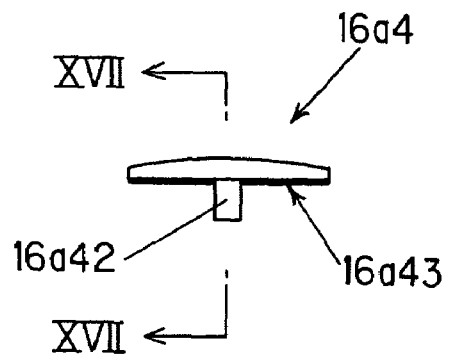
FIG. 16 is a bottom view of the fourth member 16a4 shown in FIG. 4.
Figure 17:
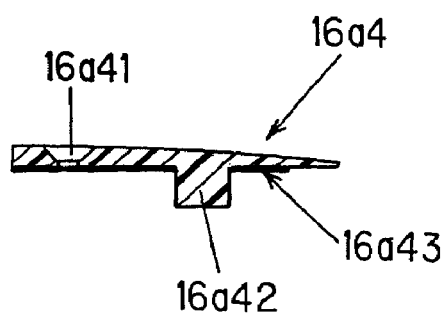
FIG. 17 is a sectional view taken along XVII-XVII in FIG. 15.

FIG. 15 is a plan view of the fourth member 16*a*4. FIG. 16 is a bottom view of the fourth member 16*a*4 (seen from below in the drawing sheet of FIG. 15). FIG. 17 is a sectional view taken along XVII-XVII in FIG. 16. As shown in FIGS. 15 to 17, the fourth member 16*a*4 is formed with a fourth hole 16*a*41 and a projection 16*a*42. In the fourth member 16*a*4, the surface designated by the symbol 16*a*43 (indicated by bold lines in FIGS. 16 and 17) is a surface contacted by the fourth member contact surface 16*a*34 (hereinafter called the "third member contact surface"). Like the first member 16*a*1, the fourth member 16*a*4 is made of a resin material (in this embodiment, epoxy resin material).

FIG. 4 will now be explained again against the backdrop of the foregoing description. The second member 16*a*2 (more exactly, the first member contact surface 16*a*21 thereof) is adhered to part of the surface of the first member 16*a*1 (the second member contact surface 16*a*14). The first member 16*a*1 and the second member 16*a*2 adhered thereto are inserted into the pouch-like third member 16*a*3 through the third hole 16*a*33 to be covered by third member 16*a*3. The thickness of the third member 16*a*3 is made thinner than that of the second member 16*a*2. Specifically, the third member 16*a*3 is given a thickness at portions that contact the second member 16*a*2 that is about one-sixth that of the second member 16*a*2.

The rigidity of the second member 16*a*2 is made smaller than that of the third member 16*a*3. As mentioned earlier, the second member 16*a*2 in this embodiment is fabricated of gel elastomer material and the third member 16*a*3 is fabricated of urethane material, so that the rigidity or stiffness of the second member 16*a*2 is made smaller than that of the third member 16*a*3.

The fourth member 16*a*4 (more exactly, the third member contact surface 16*a*43 thereof) is adhered to part of the surface of the third member 16*a*3 (the fourth member contact surface 16*a*34). At this time, the projection 16*a*42 formed on the fourth member 16*a*4 is inserted into the first hole 16*a*31 formed in the third member 16*a*3 and the first hole 16*a*11 formed in the first member 16*a*1, whereby the first member 16*a*1, third member 16*a*3 and fourth member 16*a*4 are positioned at prescribed locations. As is clear from the foregoing explanation, the surface region of the third member 16*a*3 other than that to which the fourth member 16*a*4 is adhered (the fourth member contact surface 16*a*34) constitutes a contact surface when an object is grasped.

Generally, a higher coefficient of friction can be obtained with the urethane material forming the third member 16*a*3 than with the gel elastomer material forming the second member 16*a*2 or the epoxy resin material forming the first member 16*a*1. Moreover, the coefficient of friction of the finger is further enhanced by making the surface of the third member 16*a*3 bumpy (dimpled), so that when the robot hand 10 grasps an object it can hold it securely.

Owing to the fabrication of the second member 16*a*2 of a gel elastomer material that is lower in rigidity and higher in flexibility than the third member 16*a*3, the second member 16*a*2 and the third member 16*a*3 that covers it can readily deform in compliance with the shape or profile of a held object. That is, the finger is imparted with high flexibility so as to increase the contact area between the finger (third member 16*a*3) and the held object, thereby making it possible to hold the object securely. Moreover, owing to the fact that the gel elastomer material forming the second member 16*a*2 exhibits not only high flexibility but also restoring force, the finger can be restored to its original shape when the contact between the finger and the held object is terminated.

In addition, the thickness of the third member 16*a*3 is made smaller than the thickness of the second member 16*a*2, so that deformation of the second member 16*a*2 is promoted to enhance the flexibility of the finger still further.

Owing to the fact that the first member 16*a*1 is made of epoxy resin, i.e., since the first member 16*a*1 is fabricated of a material that exhibits high rigidity and is also light in weight, the inertia mass of the finger is reduced to reduce the electric motor load, thereby making it possible to reduce the size and weight of the motor. Further, stress acting on the finger can be detected with good accuracy because the force sensor 40 is attached to the first member 16*a*1 exhibiting high rigidity.

Furthermore, the attachment of the fourth member 16*a*4 of higher rigidity than the second member 16*a*2 enables the fourth member 16*a*4 to inhibit excessive deformation of the highly flexible second member 16*a*2, so that objects can be held still more securely. Moreover, the fourth member 16*a*4 is fabricated of epoxy resin so as to be low in weight, thereby helping to minimize the inertia mass of the finger.

The explanation of FIG. 4 will be resumed. The cylindrical member 40*a* is fastened in the third hole 16*a*13 formed in the first member 16*a*1. The cylindrical member 40*a* is formed with a hole and a high-rigidity pin (connector) 44 made of a metal or resin material is inserted through this hole, the second hole 16*a*12 formed in the first member 16*a*1, the second hole 16*a*32 formed in the third member 16*a*3, and the fourth hole 16*a*41 formed in the fourth member 16*a*4, thereby interconnecting the fourth member 16*a*4 and the force sensor 40.

Owing to the interconnection of the force sensor 40 and the fourth member 16*a*4 that is located at the outermost of the finger link and exhibits high rigidity, stress received by the finger is accurately transmitted to the force sensor 40 through the fourth member 16a4, thereby enhancing the detection accuracy of the force sensor 40.

The interconnection of the fourth member 16a4 with the force sensor 40 through the cylindrical member 40a and the pin 44 simplifies the shape of the fourth member 16a4. This makes it easy to fabricate the fourth member 16a4 and also facilitates its connection (assembly) with the force sensor 40.

In the forgoing, the configuration of a finger link was explained taking the distal link 16a of the second finger 16 as an example. This configuration is also suitable for the distal links of the other fingers, notwithstanding some differences in the shapes and dimensions of particular portions. The structural features explained in the foregoing, aside from the base, force sensor and the fourth member corresponding to a nail, apply similarly to middle links and proximal links of the individual fingers, i.e., each is structured of first, second and third members that resemble the foregoing in arrangement order and materials. Explanation thereof will therefore be omitted. The metacarpus 12 to which the fingers are connected is also structured of first, second and third members whose arrangement order and materials are similar to the foregoing. Explanation thereof will therefore be omitted.

Thus in this embodiment, the robot hand 10 is given a high coefficient of friction and high flexibility overall, thereby further enhancing holding performance. Further, the formation of the first member corresponding to a bone of light-weight epoxy resin material reduces the inertia mass of the robot hand 10 attached to the end of the robot arm 36.

Second Embodiment

Figure 18:
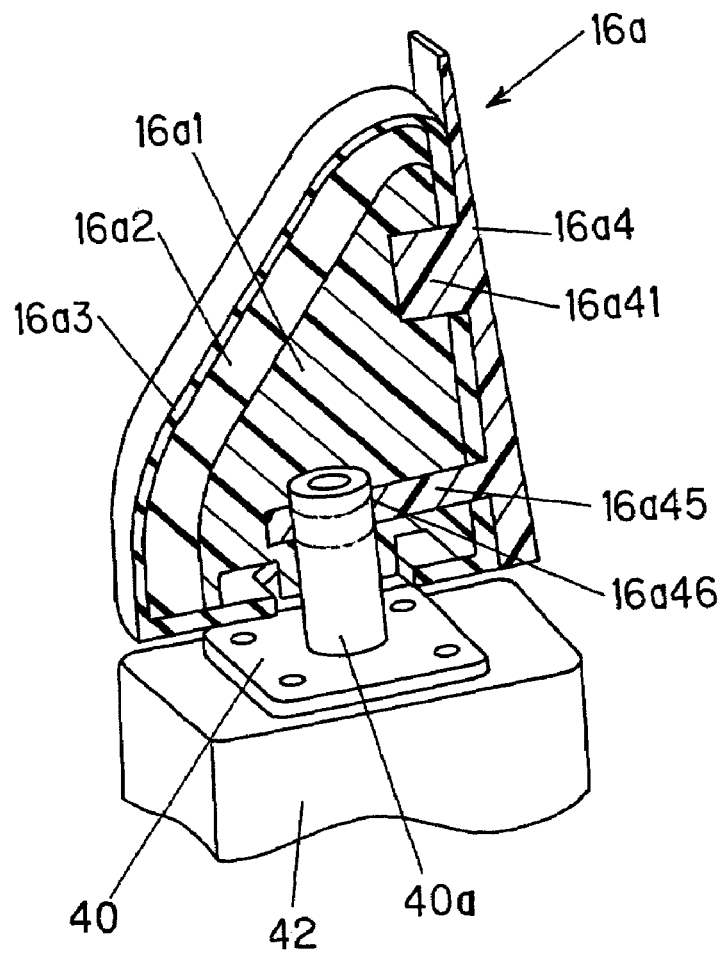
FIG. 18 is a perspective view similar to FIG. 4 showing a robot hand according to a second embodiment of the invention.

A second embodiment of this invention will now be explained with reference to FIGS. 18 and 19. FIG. 18 is a perspective view similar to FIG. 4 showing a robot hand according to the second embodiment of the invention.

Explanation will be made with focus on points of difference from the first embodiment. In the second embodiment, the fourth member 16a4 is provided with a connector 16a45 that serves in place of the pin interconnecting the fourth member 16a4 and cylindrical member 40a.

Figure 19:
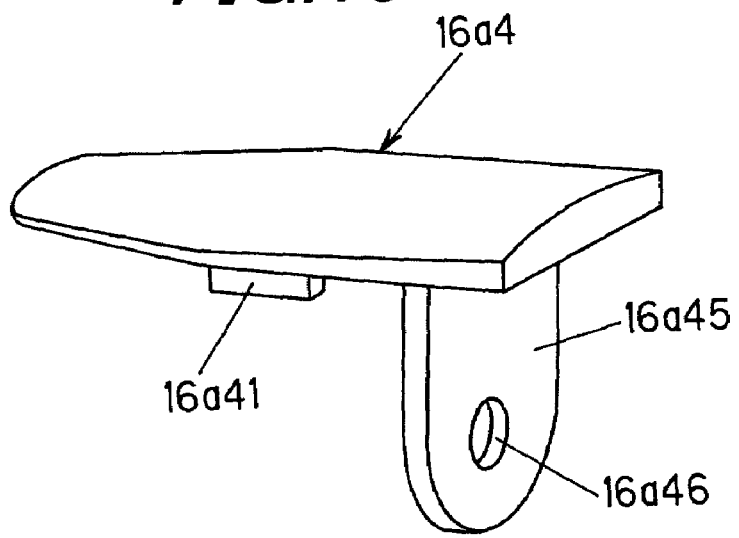
FIG. 19 is a perspective view of a fourth member shown in FIG. 18 etc.

FIG. 19 is a perspective view of the fourth member 16a4 in the second embodiment. As illustrated, the connector 16a45 provided on the fourth member 16a4 is formed with an insertion hole 16a46. As shown in FIG. 18, the cylindrical member 40a to which the force sensor 40 is attached is inserted into the insertion hole 16a46, thereby interconnecting the fourth member 16a4 and the force sensor 40.

As a result, similarly to in the first embodiment, stress received by the finger is accurately transmitted to the force sensor 40 through the fourth member 16a4, thereby enhancing the detection accuracy of the force sensor 40.

The remaining structural features of the second embodiment are the same as those of the first embodiment and will not be explained again.

As mentioned above, the first and second embodiments of this invention is configured to have a robot hand (10) having a finger (first to fifth finger 14 to 22) comprising finger links (distal links 14a to 22a, middle links 16b to 22b, proximal links 14b, 16c to 22c) and finger joints (first joints 14A to 22A, second joints 14B to 22B, third joints 16C to 22C) interconnecting the links, characterized in that: at least one of the finger links comprises; a first member (16a1); a second member (16a2) adhered to a surface of the first member; and a third member (16a3) covering at least the second member; and that a rigidity of the second member (16a2) is made smaller than the rigidities of the first member (16a1) and the third member (16a3).

It is configured such that a coefficient of friction of the third member (16a3) is made higher than the coefficients of friction of the first member (16a1) and the second member (16a2).

It is configured such that a thickness of the third member (16a3) is made smaller than the thickness of the second member (16a2).

It is configured such that the first member (16a1) is made of a resin material.

It is configured such that the second member (16a2) is made of a flexible material.

It is configured such that the third member (16a3) is made of a material with a high coefficient of friction.

It is configured such that a surface of the third member (16a3) is formed with a plurality of indentations.

It is configured to further include: a fourth member (16a4) adhered to a part of a surface of the third member (16a3); wherein the rigidity of the fourth member (16a4) is made larger than the rigidity of the second member (16a2).

It is configured such that the fourth member (16a4) is made of a resin material.

It is configured to have a robot hand (10) having a finger (first to fifth finger 14 to 22) comprising finger links (distal links 14a to 22a, middle links 16b to 22b, proximal links 14b, 16c to 22c) and finger joints (first joints 14A to 22A, second joints 14B to 22B, third joints 16C to 22C) interconnecting the links, characterized in that: at least one of the finger links comprises; a base (42) to which a force sensor (40) is attached; a first member (16a1) connected to the base (42) through the force sensor (40); a second member (16a2) adhered to a surface of the first member (16a1); a third member (16a3) covering at least the second member (16a2); and a fourth member (16a4) adhered to a part of a surface of the third member (16a3); and that the fourth member (16a4) is interconnected with the force sensor (40).

In the first embodiment, it is configured such that the fourth member (16a4) is interconnected with the force sensor (40) through a connector (cylindrical member 40a, pin 44).

Although it is explained in the foregoing that the first member 16a1 and fourth member 16a4 are fabricated of epoxy resin, they can instead be made of ABS, PEEK or other resin material. Although it is explained that the second member 16a2 is fabricated of gel elastomer material, it can instead be made of sponge or other such flexible material. Although it is explained that the third member 16a3 is fabricated of urethane, it can instead be made of silicone rubber or other such material having a high coefficient of friction. In other words, the materials of the individual components are not limited to those set out as examples but can be suitably selected in accordance with the kind of objects the robot hand is intended to hold.

Although it is explained that all of the finger links (distal link, middle link and proximal link) and the metacarpus are structured of first to third members, it is possible to provide only some of the finger links and the metacarpus with first to third materials.

Figure 20:
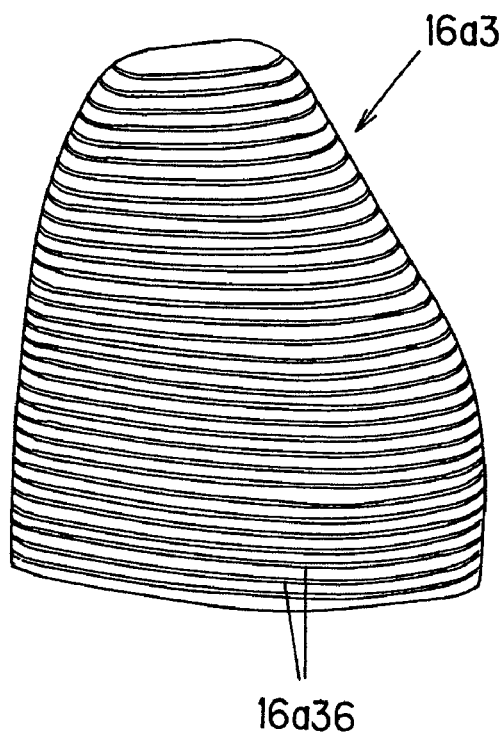
FIG. 20 is a perspective view similar to FIG. 14 showing the surface morphology of the third member shown in FIG. 4 etc.
Figure 21:
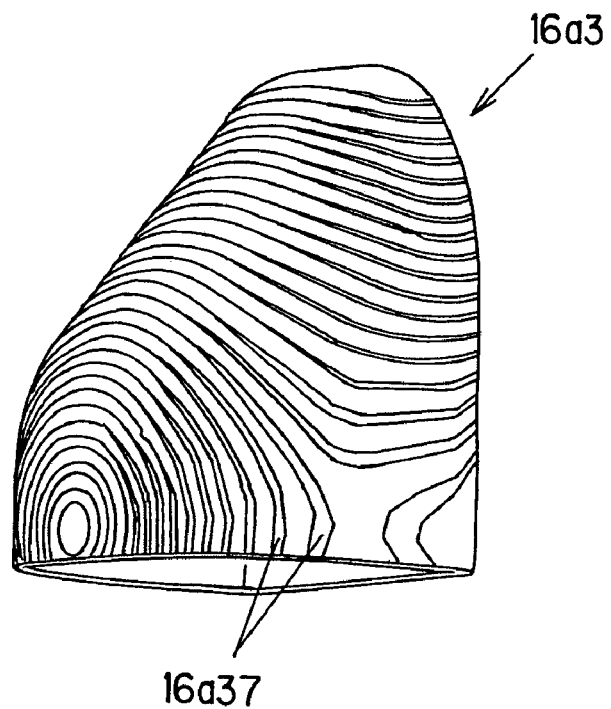
FIG. 21 is a perspective view similarly showing the surface morphology of the third member shown in FIG. 4 etc.

Although the surface morphology of the third member 16a3 is explained as being dimpled, it is only required to be irregular and any of various other morphologies can be adopted, including, for example, the striped pattern of FIG. 20 formed of numerous evenly spaced linear grooves 16a36 or the human fingerprint pattern of FIG. 21 formed of numerous curved grooves 16a37.

INDUSTRIAL APPLICABILITY

In accordance with this invention, at least one finger link of a robot hand comprises a first member, a second member adhered to the surface of the first member, and a third member covering at least the second member, and the rigidity of the second member is made lower than the rigidity of the first member and the third member. As a result, the flexibility of the finger is improved by the second member, thereby increasing the contact area between the third member and a held object, so that the object can be securely held.

The invention claimed is:

1. A robot hand having a finger comprising finger links and finger joints interconnecting the links, wherein at least one of the finger links comprises;

a base to which a force sensor is attached;
a first member connected to the base through the force sensor;
a second member adhered to a surface of the first member;
a third member covering at least the second member; and
a fourth member adhered to a part of a surface of the third member,
wherein the fourth member is interconnected with the force sensor through a connector.

* * * * *